(12) United States Patent
Schmitt et al.

(10) Patent No.: US 6,887,416 B1
(45) Date of Patent: May 3, 2005

(54) METHOD AND DEVICE FOR COMPRESSION MOULDING A CLOSURE CAP

(75) Inventors: Dieter Schmitt, Reinach (CH); Raymond Stich, Radersdorf (FR)

(73) Assignee: Crown Cork & Seal Technologies Corporation, Alsip, IL (US)

( * ) Notice: Subject to any disclaimer, the term of this patent is extended or adjusted under 35 U.S.C. 154(b) by 399 days.

(21) Appl. No.: 10/129,730

(22) PCT Filed: Nov. 1, 2000

(86) PCT No.: PCT/GB00/04175

§ 371 (c)(1),
(2), (4) Date: Sep. 17, 2002

(87) PCT Pub. No.: WO01/34362

PCT Pub. Date: May 17, 2001

(30) Foreign Application Priority Data

Nov. 11, 1999 (EP) .............................................. 99811036

(51) Int. Cl.[7] .............................. B28B 7/22; G29C 43/32
(52) U.S. Cl. ........................ 264/255; 264/250; 264/268; 264/294; 425/352; 425/355; 425/809
(58) Field of Search ................................. 264/255, 250, 264/268, 294; 425/352, 355, 809

(56) References Cited

U.S. PATENT DOCUMENTS

| 4,423,820 A | * | 1/1984 | Vangor ........................ 215/252 |
| 4,816,305 A | * | 3/1989 | Stillwell et al. ............ 428/35.7 |
| 6,325,225 B1 | * | 12/2001 | Druitt et al. ................. 215/252 |

* cited by examiner

Primary Examiner—Stephen J. Lechert, Jr.
(74) Attorney, Agent, or Firm—Diller, Ramik & Wight

(57) ABSTRACT

A method and device for the production of a closure cap having a first part (16, 17) and a second part (18), joined together by at least one thinner section (19). The device contains a female mould part (11) and a male mould part (12), which are moveable relative to one another, in order to enclose a mould cavity. After the closing of the mould cavity, an additional mould part (14) is moveable relative to the mould cavity. In order to reduce the volume thereof, until the plastics material fills the mould cavity completely. Consequently the invention ensures that when compression moulding in the mould cavity, the closure cap and in particular also the thinner section (19) are formed completely in the mould provided.

11 Claims, 2 Drawing Sheets

METHOD AND DEVICE FOR COMPRESSION MOULDING A CLOSURE CAP

BACKGROUND OF THE INVENTION

The invention concerns a method and a device for compression moulding a container closure cap, which has a first part and a second part, which are joined together by at least one thinner section. For example, a closure cap having a body and a tamper evident band joined together by thin frangible bridges or a closure cap having a body and a lid connected by a thin hinge section.

SUMMARY OF THE INVENTION

The aim of the invention is to design a method and apparatus so as to guarantee that during compression moulding, the closure cap and in particular the thinner section or sections are formed completely in the mould cavity provided, without it being necessary to insert excess plastics material into the mould, which is then pressed out of the mould upon closing of the mould cavity.

Examples of the invention are explained below with reference to the accompanying drawings, in which:

DESCRIPTION OF THE PREFERRED EMBODIMENTS

Figure 1:
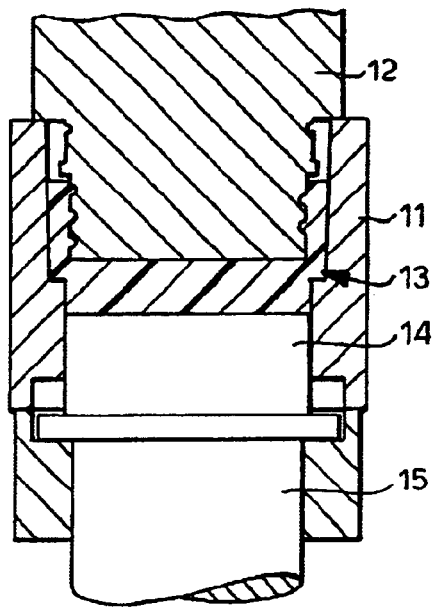
FIG. 1 shows a schematic representation of a female mould part and a male mould part of a compression moulding device according to the invention in a closed position.
Figure 2:
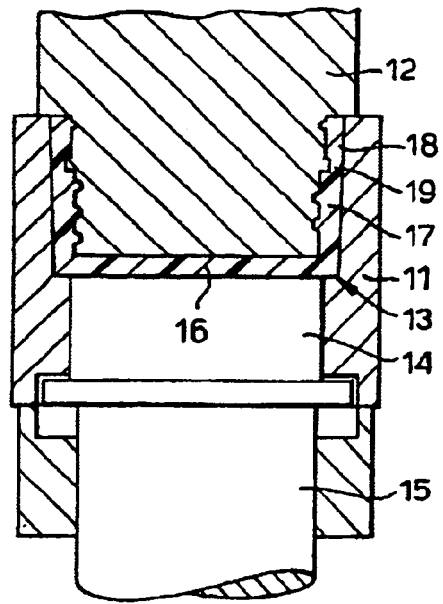
FIG. 2 shows the female mould part and the male mould part of FIG. 1 in a final position.

FIGS. 1 and 2 show schematically a female mould part 11 and a male mould part 12, which are axially moveable relative to one another. In their open position (not represented), the female mould part 11 and the male mould part 12 are separated by a distance from one another. A portion of softened plastics material is fed into the female mould part, whilst the mould is in this open position.

The female mould part 11 and the male mould part 12 are then moved relative to one another (by means not represented) into the closed position shown in FIG. 1, where a circumferential edge of the male mould part lies on an upper edge of the female mould part. In this position, the female mould part and male mould part define a mould cavity between one another, in the form of a container closure cap. In the position shown in FIG. 1 the plastics material 13 does not yet fill the mould cavity completely.

An additional mould part 14 is arranged in the female mould part 11. The mould part 14 is moveable relative to the mould cavity by means of a hydraulic ram 15, in order to reduce the volume of the mould cavity, until the plastics material 13 fills the mould cavity completely, as shown in FIG. 2. The finished container closure cap represented in FIG. 2 has a first part in the form of a bottom end 16 and a circumferential wall 17 extending from the bottom end, a second part in the form of an annular element 18 and at least one thinner section 19 joining the two parts together. The mould cavity correspondingly has a first cavity part for forming the first part 16, 17 of the closure cap, a second cavity part for forming the second part 18 of the closure cap and an intermediate cavity part for forming the thinner section 19.

After closing the mould cavity, the position shown in FIG. 1, the plastics material (from the portion of plastics material fed in to the mould cavity when the male and female mould parts were in their open position) fills the first cavity part, which forms the first part, 16, 17 of the closure cap. As a rule, the plastics material fills the first cavity part virtually completely, but does not fill or at most partly fills the second cavity part (which forms the second part 18 of the closure cap) and the intermediate cavity part (which forms the thinner section 19). Upon movement of the additional mould part 14 to reduce the volume of the mould cavity, part of the plastics material is then pressed out of the first cavity part through the intermediate cavity part and into the second cavity part, until the plastics material fills the whole mould cavity completely.

The annular element 18 may be, for example, a tamper evident band, which is joined to the circumferential wall 17 via a thinner section 19 in the form of a predetermined breaking line or line of weakening, so that upon the removal of the closure cap from a container the tamper evident band 18 is separated from the circumferential wall 17. Such a predetermined breaking line 19 is in a narrow area of the mould cavity, in which the plastics material is only thin and if necessary also has openings, so that the line of weakening 19 is defined by a plurality of thin, frangible bridges.

In the example described above, the additional mould part 14 is arranged in the female mould part 11. However, the additional mould part (for reducing the volume of the mould cavity after closing of the same) could also be arranged, with equal effect in the male mould part 12 instead of in the female mould part 11.

Figure 3:
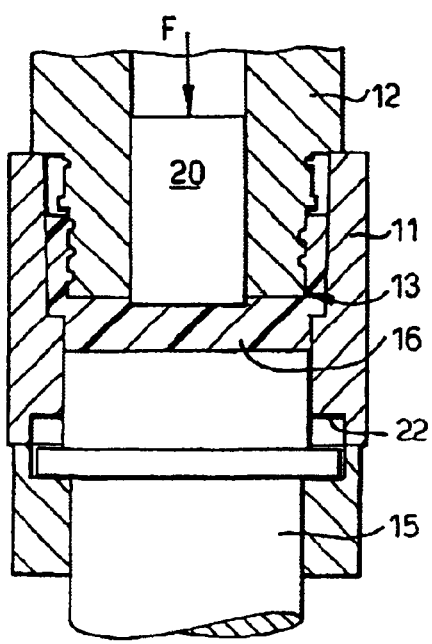
FIG. 3 shows a female mould part and a male mould part of another embodiment of the compression moulding device in a closed position.
Figure 4:
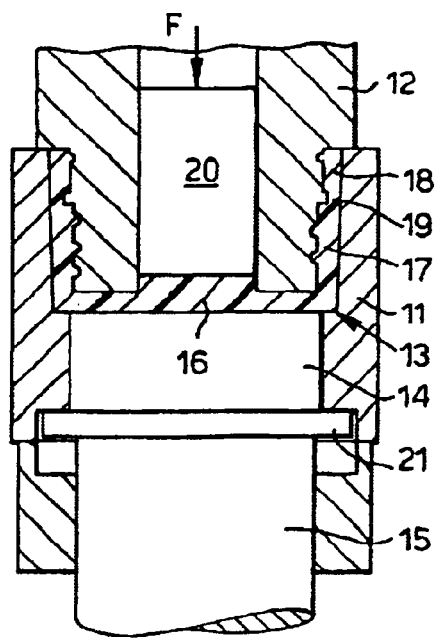
FIG. 4 shows the female mould part and the male mould part of FIG. 3 in a final position.

The embodiment of the compression moulding device according to FIGS. 3 and 4 contains the same elements as the device according to FIGS. 1 and 2, and these elements are designated with the same reference numbers as in FIGS. 1 and 2.

Unlike the device according to FIGS. 1 and 2, in the device according to FIGS. 3 and 4 a second additional mould part 20 is arranged in the male mould part 12. The second additional mould part 20 is moveable in the male mould part 12 against the action of a force F. In the device according to FIGS. 3 and 4, after the mould cavity is closed by the hydraulic ram 15, the first additional mould part 14 is moved into a predetermined final position, reducing the volume of the mould cavity, until the plastics material fills the whole mould cavity completely. The pre-determined final position in the example is defined by a band 21, on the additional mould part 14, knocking against a counter-face 22 (FIG. 3) on the female mould part 11.

The second additional mould part 20, is shifted against the action of the force F by the pressure of the plastics material 13, which is produced by the movement of the first additional mould part 14. Thus, the second additional mould part 20 is used for volume equalisation, which means that the final volume of the mould cavity is adapted exactly to the size of the portion of plastics material fed into the mould cavity. The final pressure of the plastics material 13 produced in the mould cavity is controlled by the size of the force F.

Through the predetermined final position of the first additional mould part 14 moveable in the female mould 11, the external shape of the closure cap formed, is precisely predetermined, regardless of any deviations from a nominal size occurring in the size of the portion of plastics material fed into the mould cavity.

The device according to FIGS. 5 and 6 again contains the second additional mould part 20 moveable in the male mould part 12 against the action of the force F. The male mould part 12 and a female mould part 111 are axially movable relative to one another. In the closed position represented, a circumferential part of the male mould part 12 lies on an upper edge of the female mould part 111, the male mould part and the female mould part define a mould cavity between one another in the shape of a container closure cap. The female mould part 111 is held such that it can move axially in a holder part 110 and is spring-loaded with regard to the holder part 110 in the final position shown in FIG. 5 by means of a compression spring 109.

Figure 6:
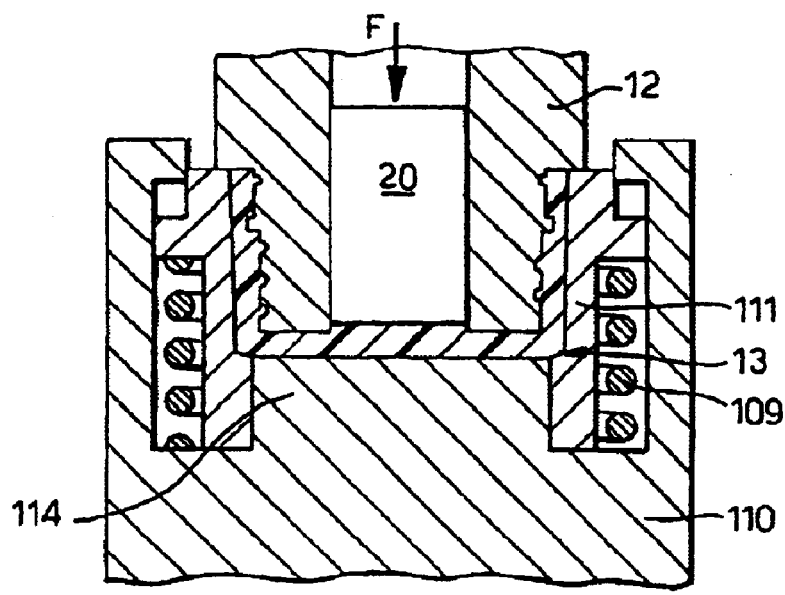

A cylindrical projection 114 of the holder part 110 projects into the female mould part 111 and forms a first additional mould part. The female mould part 111 (and the mould cavity formed therein) and the additional mould part 114 are moveable axially relative to one another against the action of the spring 109, in order to reduce the volume of the mould cavity, until the plastics material 13 fills the whole cavity completely as shown in FIG. 6. This movement takes place through the fact that means (not represented) for closing the mould cavity presses the circumferential part of the male mould part 12 on to the upper edge of the female mould part 111, and moves the female and male mould parts and thereby the mould cavity further together into the holder part 110. After this movement, the mould cavity and the first additional mould part 114 have a predetermined final position relative to one another (FIG. 6), which is defined in this example through the fact that a lower edge of the female mould part 111 knocks against a counter-face 122 of the holder part 110.

Figure 5:
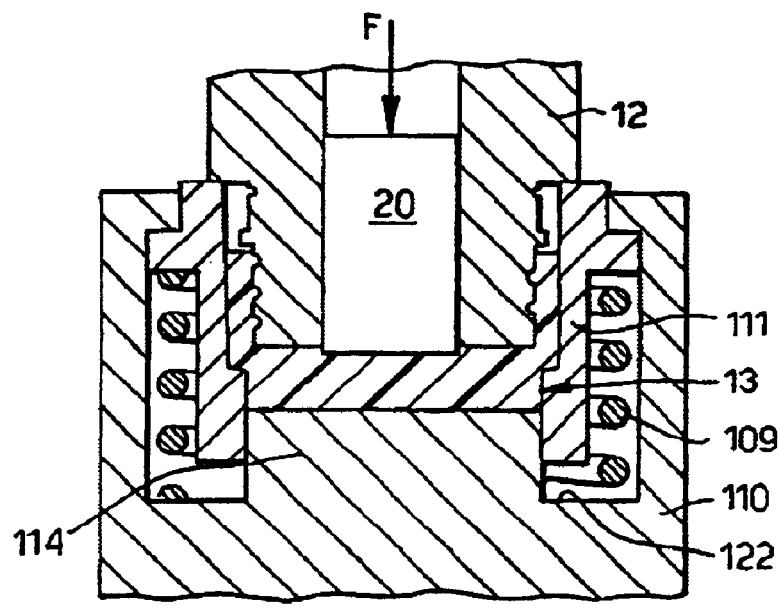
FIG. 5 shows the female mould part and the male mould part of a third embodiment of the compression moulding machine in a closed position and FIG. 6 shows the female mould part and the male mould part of FIG. 5 in a final position.

The purpose and effect of the second additional mould part 20 in the device according to FIGS. 5 and 6 are the same as in the device according to FIGS. 3 and 4.

Although a preferred embodiment of the invention has been specifically illustrated and described herein, it is to be understood that minor variations may be made in the apparatus without departing from the spirit and scope of the invention, as defined by the appended claims.

What is claimed is:

1. A method for compression moulding a container closure cap, which has a first part (16, 17) and a second part (18), which are joined together by at least one thinner section (19), characterised by the following steps:

Preparing a mould with a female mould part (11; 111) and a male mould part (12), which are moveable relative to one another, in order to enclose there between a mould cavity, which has a first mould part for forming the first part (16, 17) of the closure cap, a second mould part for forming the second part (18) of the closure cap and a intermediate cavity part for forming the thinner section (19), Feeding a portion of plastics material into the female mould part (11; 111), Moving the female mould part (11; 111) and the male mould part (12) relative to one another to close the mould cavity, Moving an additional mould part (14; 114) relative to the mould cavity in such a way that the volume of the mould cavity is reduced and a part of the portion of plastics material is pressed from the first cavity part through the intermediate cavity part into the second cavity part, in order to form the thinner section (19) and the second part (18) of the closure cap.

2. A method according to claim 1, for compression moulding a container closure cap, in which the first part (16, 17) defines a bottom end and a circumferential wall and the second part (18) defines an annular element.

3. A device for compression moulding of a container closure cap, which has a first part (16, 17) and a second part (18), which are joined together by at least one thinner section (19), characterised by a female mould part (11; 111) and a male mould part (12), which are moveable relative to one another, in order to enclose a mould cavity, which has a first cavity part for forming the first part (16, 17) of the closure cap, a second cavity part for forming the second part (18) of the closure cap and an intermediate cavity part for forming the thinner section (19), and an additional mould part (14; 114), which after the closing of the mould cavity is moveable relative to the mould cavity, in order to reduce the volume of the mould cavity and to press plastics material (13) out of the first cavity part through the intermediate cavity part into the second cavity part, until the plastics material fills the mould cavity completely.

4. A device according to claim 3, characterised in that the first cavity part is formed for moulding a bottom end (16) and a circumferential wall (17) of the closure cap and the second cavity part is formed for moulding an annular element (18) of the closure cap.

5. A device according to claim 4, characterised in that the second cavity part is formed for moulding a tamper evident band (18) and the intermediate cavity part is formed for moulding a nominal breaking line (19) between the circumferential wall (17) and the tamper evident band (18).

6. A device according to claim 3, characterised by a second additional mould part (20), which after the complete filling of the mould cavity is moveable in response to the pressure of the plastics material (13) in the mould cavity.

7. A device according to claim 6, characterised in that, after the closing of the mould cavity, the first-mentioned additional mould part (14; 114) is moveable into a predetermined final position.

8. A device according to claim 6, characterised in that the first-mentioned additional mould part (14; 114) is moveable axially in the female mould part (11; 111) and the second additional mould part (20) is moveable axially in the male mould part (12).

9. A device according to claim 4, characterised by a second additional mould part (20), which after the complete filling of the mould cavity is moveable in response to the pressure of the plastics material (13) in the mould cavity.

10. A device according to claim 5, characterised by a second additional mould part (20), which after the complete filling of the mould cavity is moveable in response to the pressure of the plastics material (13) in the mould cavity.

11. A device according to claim 7, characterised in that the first-mentioned additional mould part (14; 114) is moveable axially in the female mould part (11; 111) and the second additional mould part (20) is moveable axially in the male mould part (12).

* * * * *